Aug. 6, 1946.  R. C. NEWHOUSE  2,405,231
AIRCRAFT BLIND LANDING SYSTEM
Filed March 31, 1942  4 Sheets-Sheet 1
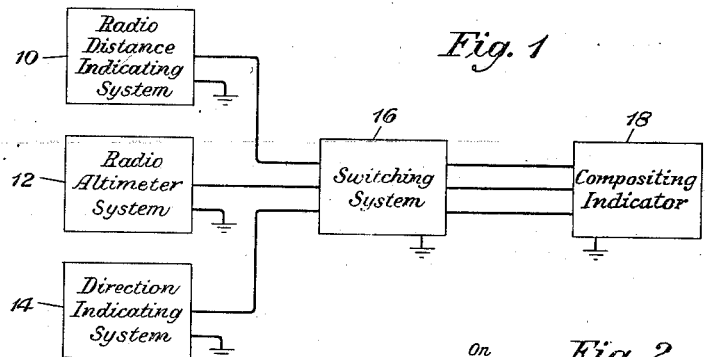
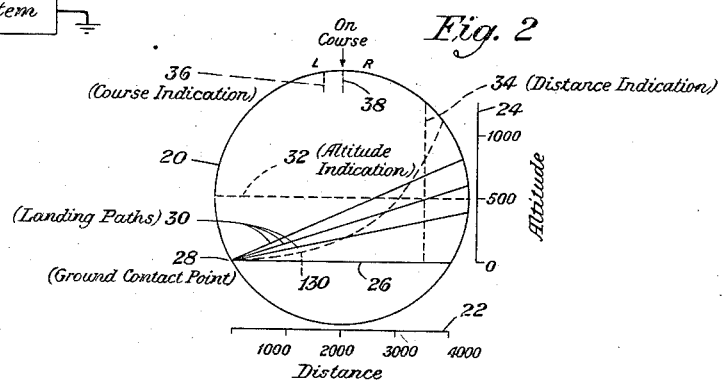
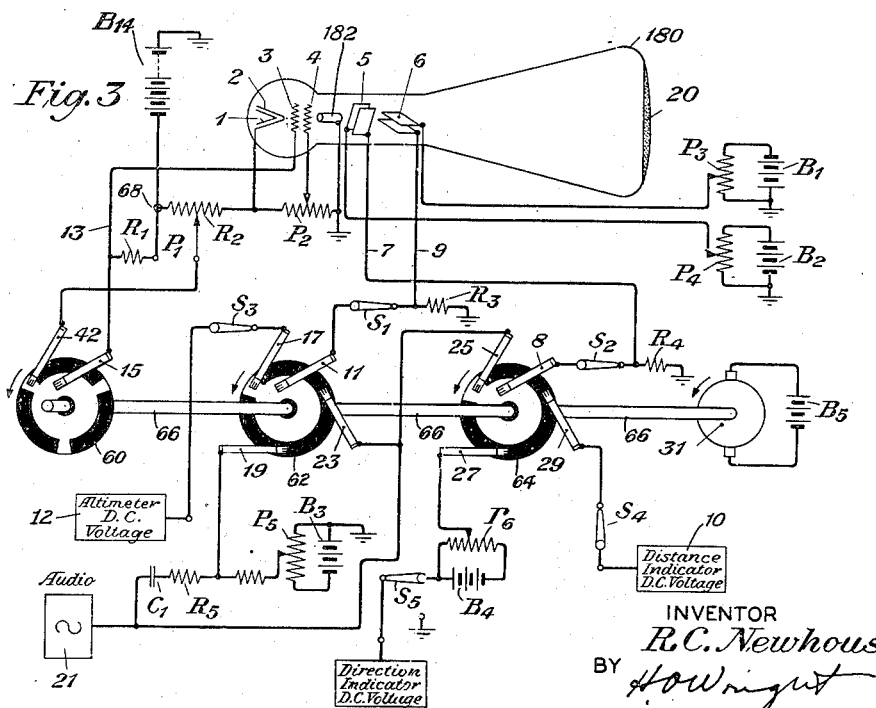
INVENTOR
R. C. Newhouse
BY
ATTORNEY Aug. 6, 1946.  R. C. NEWHOUSE  2,405,231
AIRCRAFT BLIND LANDING SYSTEM
Filed March 31, 1942  4 Sheets-Sheet 2
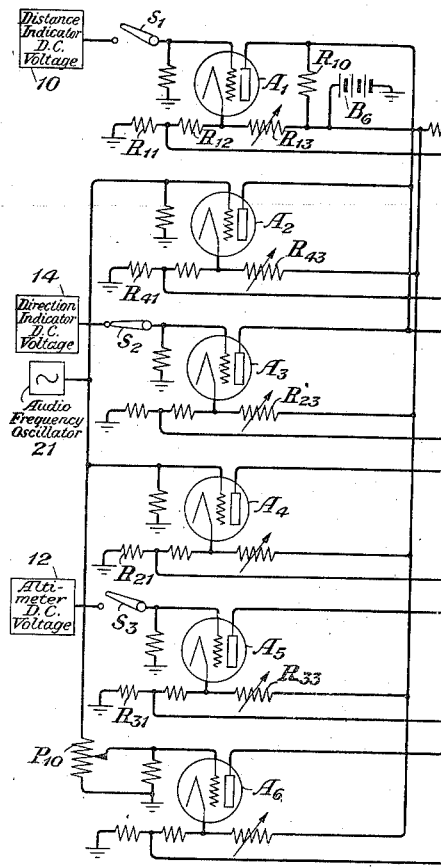
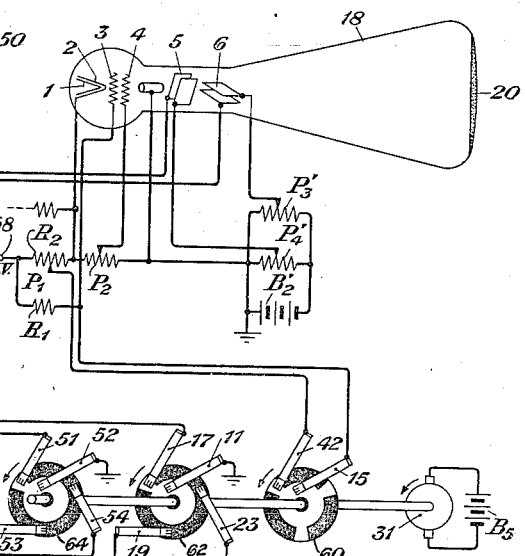
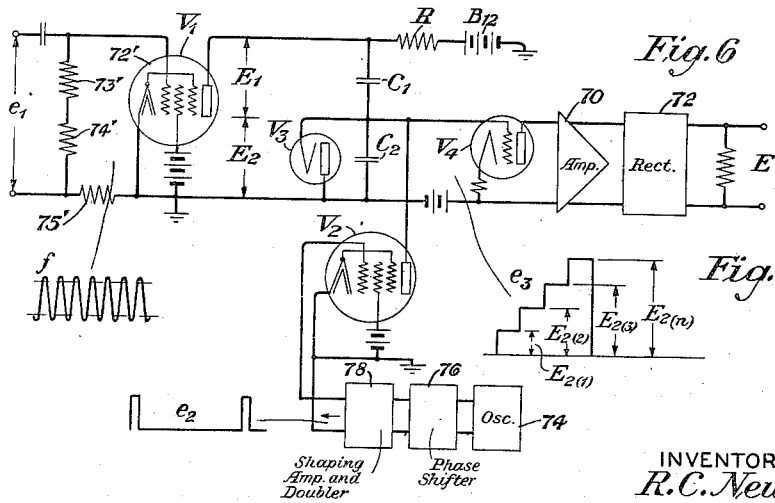
INVENTOR
R. C. Newhouse
BY H. O. Wright
ATTORNEY

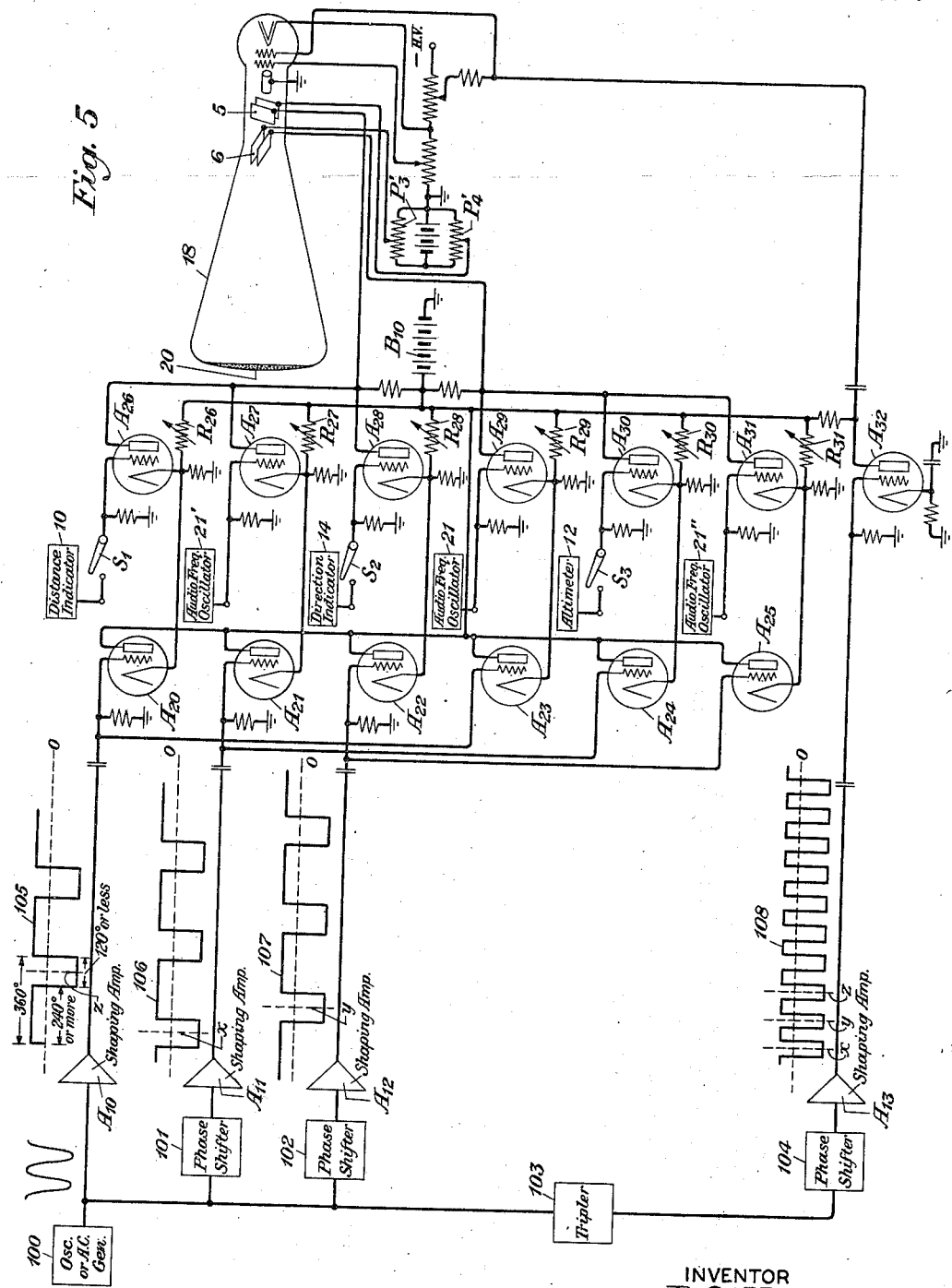

Patented Aug. 6, 1946

2,405,231

UNITED STATES PATENT OFFICE 2,405,231

AIRCRAFT BLIND LANDING SYSTEM

Russell C. Newhouse, Millburn, N. J., assignor to Bell Telephone Laboratories, Incorporated, New York, N. Y., a corporation of New York Application March 31, 1942, Serial No. 437,013

12 Claims. (Cl. 250—11)

This invention relates to blind landing systems for aircraft. More particularly, it relates to improved methods and systems for presenting distance, direction, and altitude indications simultaneously on a single indicator and so correlated as to facilitate the navigation of an aircraft along any one of a plurality of landing paths.

In the preferred illustrative embodiments of systems of the invention to be described hereinafter, altitude, distance and direction indications are presented simultaneously on a single cathode ray oscilloscope screen, the altitude indication being in the form of a horizontal line, whose position above a prefixed line is a function of the altitude; the distance indication being in the form of a vertical line, whose position to the right of a prefixed point is a function of distance; and the direction left or right (or on) a particular beacon course being indicated by the position of an auxiliary indication with respect to an index mark at the top center of the indicator target.

Switching means, which may take the form of a rotating commutator or of an electronic device, repeatedly present successive voltages representing the three indications desired, the frequency of repetition being sufficient to provide for retention of the three resulting indications on the cathode ray tube target without perceptible flicker.

Indications of the three types desired may be obtained by any of the numerous well-known systems for providing indications of altitude, direction and distance, provided the systems can be conveniently modified to furnish voltages (preferably direct current) proportional to the magnitudes of the quantities involved over the respective desired ranges of indications.

This invention will be readily understood from the following description, when read in connection with the attached drawings in which Fig. 1 indicates in block schematic diagram form the general arrangement of systems of the invention;

Fig. 2 illustrates a typical composite indication of altitude, distance and direction as afforded by systems of the invention;

Fig. 3 illustrates a system of the invention employing a simple rotary commutator switching arrangement;

Fig. 4 illustrates a system of the invention employing a plurality of amplifiers in conjunction with a rotary commutator switching arrangement;

Fig. 5 illustrates a system of the invention employing an electronic switching or commutating arrangement;

Fig. 6 illustrates an improved frequency metering circuit suitable for converting frequency indications into direct current voltages for use in systems of the invention;

Fig. 6a is a voltage graph relating to the operation of the circuit of Fig. 6.

Figure 7:
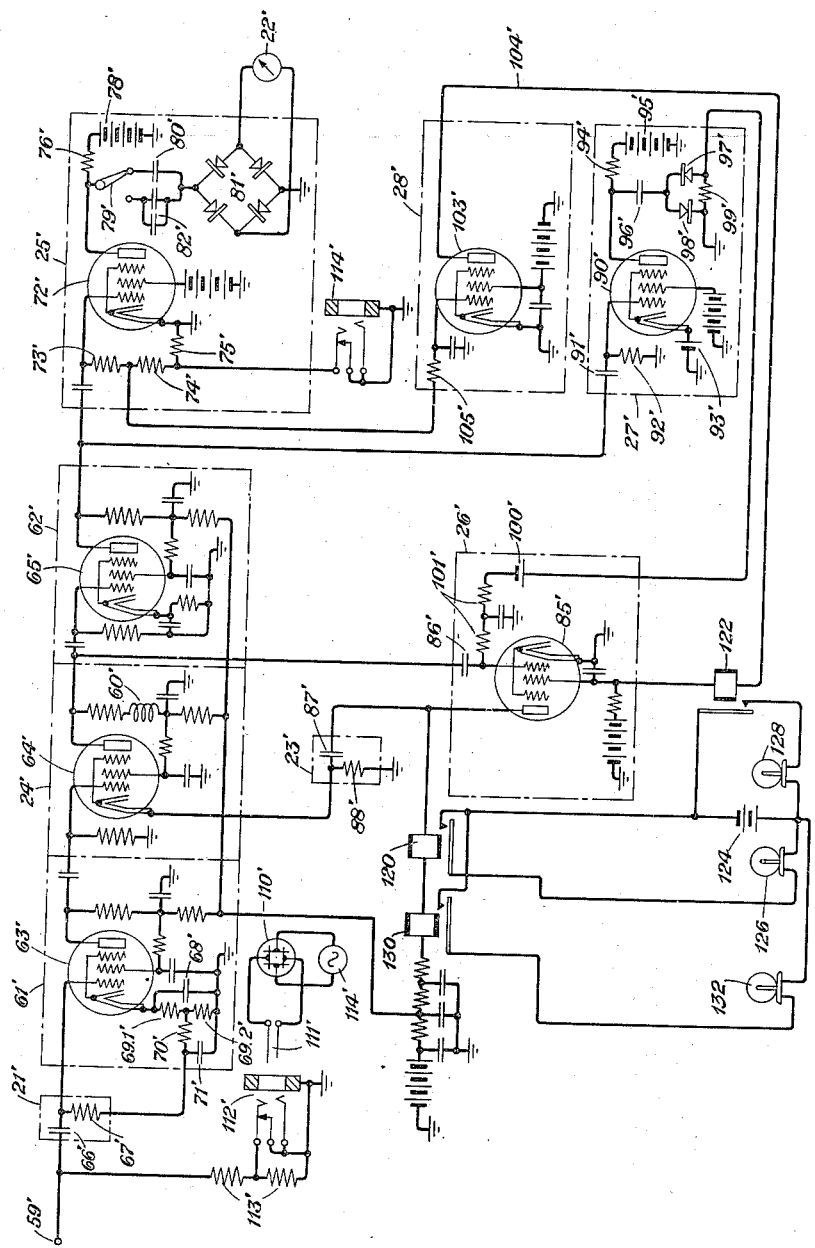
Fig. 7 illustrates types of critical altitude and no-signal alarms which can advantageously be employed with blind landing systems.

The general arrangement of systems embodying the principles of the invention will be understood from a description of Fig. 1 which shows in block schematic form, an embodiment of the invention. In that figure, 10, 12 and 14, represent, respectively, radio distance indicating apparatus, a radio altimeter and direction indicating apparatus. These apparatus units are connected to a switching system 16, various forms of which are illustrated in Figs. 3, 4 and 5. The switching system is in turn connected to an indicator 18 capable of compositing several independent indications, such as a cathode ray oscilloscope. All of the aforesaid apparatus is located upon the aircraft, the navigation of which is to be aided thereby. Cooperative apparatus may or may not be required at known reference points on the earth's surface as will presently be apparent. The radio distance indicating apparatus 10 can, for example, be of the general type described in the patent to H. T. Budenbom, No. 2,248,215, issued July 8, 1941. The radio altimeter can be of the general type described in the patent to W. H. C. Higgins et al., No. 2,206,896, issued July 9, 1940, modified in accordance with Fig. 6 of the accompanying drawings, or the patent to J. G. Chaffee, Reissue No. 21,955, issued November 25, 1941, similarly modified. The direction indicating apparatus 14 can be of the type described in the patent to J. W. Greig, No. 2,003,932, issued June 4, 1935. The indicating voltages that are created in each of the aforesaid apparatus units are successively impressed upon a compositing indicator such as a cathode ray oscilloscope by means of the switching apparatus 16.

As shown in Fig. 2, the screen or target of the indicator or oscilloscope has associated with it a horizontal scale representing the distance from the aircraft to a fixed point such as a particular position on a landing field; a vertical scale representing the altitude of the craft above the terrain; and at the top of the target an index mark indicating the "on course" heading of the craft with respect to a fixed point or beacon station at the landing field. The distances represented on the scales are, of course, purely illustrative and are not a limitation upon the scope of the invention. They may be in feet, yards, meters or other convenient units of distance. The point 28 upon the target represents the point of zero distance and zero altitude.

The altitude of the craft, in flight, is represented by a horizontal line such as 32 which is parallel to the ground line 26 upon the target.

The distance of the craft from the fixed point is represented by a vertical line such as 34, and the deviation of the craft from the beam transmitted from the ground station is represented by a short line such as 36, which will be to the left or right of the "on course" indication at the top of the target if the heading of the craft is to the left or the right, respectively, of the on course heading.

Extending upward and toward the right from the ground contact point 28, are a plurality of inclined reference lines 30 and 130 which facilitate the landing of the aircraft. By maneuvering the craft to keep the intersection of the altitude indicating line and the distance indicating line upon one of the inclined lines, 30 or 130, a particular gliding angle may be readily maintained or a particular landing path may be followed until contact is made with the field. The inclined line or path to be chosen as a guide depends upon the optimum glide angle of the particular craft for the wind velocity and similar conditions prevailing at the time of landing.

Fig. 3 shows schematically a system of the invention employing three commutators 60, 62 and 64 fixed to a common motor-driven shaft 66 for applying rapidly in succession to an oscilloscope the voltages representing distance, altitude and direction, together with appropriate positioning and deflecting voltages to be described presently.

The cathode ray oscilloscope 180 is of conventional type having a heater 1, a cathode 2, a control grid 3, a focusing grid 4, a focusing tube 182 and two pairs of deflecting plates 5 and 6, respectively, the plates 5 moving the beam horizontally and the plates 6 moving it vertically. Throughout this specification the deflecting plates that move the beam horizontally will be referred to as the horizontal deflecting plates and those that move the beam vertically as the vertical deflecting plates. One of the horizontal deflecting plates is connected to the potentiometer $P_4$ to which is connected the battery $B_2$ as shown. The other horizontal deflecting plate is connected by conductor 7 to a brush 8 of the commutator 64, the connection including the switch $S_2$. A resistance $R_4$ is connected between the conductor 7 and ground for the purpose of controlling the voltage applied to the horizontal deflecting plates 5. One of the vertical deflecting plates 6 is connected to the potentiometer $P_3$ to which the battery $B_1$ is connected as shown. The other vertical deflecting plate is connected by conductor 9 to the brush 11 of the commutator 62, the connection including the switch $S_1$. A resistance $R_3$ is connected between conductor 9 and ground for the purpose of controlling the voltage applied to the vertical deflecting plates 6.

The control grid 3 is connected by conductor 13 to the brush 15 of the commutator 60. The other brush 42 of the commutator 60 is connected to a point upon the resistance $R_2$ of the potentiometer $P_1$. A source of negative high voltage $B_{14}$ is connected to terminal 68 between the resistances $R_1$ and $R_2$. The cathode 2 is connected between the potentiometers $P_1$ and $P_2$, and the focusing grid 4 and tube 182 are connected to the potentiometer $P_2$ as shown.

The direct current, altimeter, voltage from source 12, which should be of the type described above, is applied to the brush 17 of the commutator 62 through the switch $S_3$. The brush 19 of that commutator is connected to the potentiometer $P_5$ to which is attached the battery $B_3$, as shown, and that brush is also connected to the source of audio frequency oscillations 21 through the resistance $R_5$ and the condenser $C_1$. The audio frequency source 21 is also connected to the brush 23 of the commutator 62 and to the brush 25 of the commutator 64.

The direct current direction indicating voltage from source 14 is applied to the brush 27 of the commutator 64 through the switch $S_5$ and the potentiometer $P_6$ with its associated battery $B_4$. The direct current distance indicating voltage is applied through the switch $S_4$ to the brush 29 of the commutator 64. The commutators, as previously mentioned, are all driven by the motor 31 having a source of power $B_5$ associated therewith. While the speed of the motor need not be constant it should be sufficiently high, for example, 900 revolutions per minute or more, in order to prevent pattern flicker. The commutators are designed, as shown, so that the brushes 8 and 11, respectively, are connected for a few degrees in each revolution to each of the three other brushes of the respective commutators.

Brush 15 connects to brush 42 for a few degrees at each of three points on commutator 60, as shown, the three points corresponding with the positions of the three outer brushes of the other two commutators.

As clearly shown on the drawing, the commutator 60 is preferably arranged so that the duration of contact between the brush 15 and the brush 42 of that commutator, is less than the duration of contact between brushes of the commutators 62 and 64. Furthermore, in the case of the commutator 60, contact begins later and ends earlier than in the case of commutators 62 and 64.

As will now be apparent, the commutator 60 controls the voltage applied to the control grid 3 of the cathode ray tube 18. When this commutator circuit is open the beam of the cathode ray tube is cut off by the negative voltage applied to control grid 3 of the tube by source $B_{14}$ through resistance $R_1$. When the circuit is completed through the commutator 60 and brushes 15 and 42, the voltage on control grid 3 is reduced to that at the intermediate or brush contact point of potentiometer $P_1$, and the beam is then permitted to strike the screen of the cathode ray tube. The potentiometer $P_1$ permits adjustment of the voltage on the grid during the intervals that the ray is on the target, or screen, of the cathode ray tube for the purpose of adjusting the brightness of the cathode ray spot. The resistance $R_1$ is large compared to $R_2$ and its purpose is to prevent an open grid circuit when the commutator circuit is open. The beam focus is adjusted by the potential applied through the potentiometer $P_2$ to the grid 4.

The manner in which the apparatus is adjusted for providing the composite indication of distance, altitude and direction is as follows: With the motor operating and the switches $S_1$ and $S_2$ open, the potentiometers $P_3$ and $P_4$ are adjusted to position the spot of the beam of light at a point upon the target represented by point 28 of Fig. 2. Thereupon, switches $S_1$ and $S_2$ are closed and switches $S_3$ and $S_4$ are opened, and switch $S_5$ thrown to the ground position. This will serve to apply the voltage of the audio frequency oscillator 21 alternately to the pairs of deflecting plates 5 and 6 of the oscilloscope. This will cause to appear upon the target the horizontal line 26 and a short vertical line near the top and center of the target, the vertical length of which is adjusted by potentiometer $P_5$ as will appear hereinafter and which should be adjusted by potentiometer $P_6$ to coincide with the index mark 38 corresponding to an on course or zero deviation directional signal. Line 26 represents zero altitude. Zero distance is represented by its left end, point 28. The switches last mentioned are preferably ganged so that they may be thrown simultaneously to the positions last stated and in that way the zeros of the respective scales may be checked quickly at any time.

When the switches $S_3$, $S_4$ and $S_5$ are thrown to their operating positions, the direct current voltages of the altimeter source 12, the distance indicator source 10 and the direction indicator source 14 will be impressed in succession upon the oscilloscope and will produce deflections of the beam in order to indicate altitude, distance and direction, respectively, the said indications being presented with such rapidity as to appear upon the screen simultaneously.

This is effected in the following manner. With the commutators in the position shown in Fig. 3, the direct current voltage from the altimeter will be impressed upon the vertical deflecting plates 6 and, simultaneously, the audio frequency from the source 21 will be applied through the commutator 64 to the horizontal deflecting plates 5. There will, accordingly, be traced upon the screen or target 29, a horizontal line, the vertical position of which indicates the altitude of the aircraft above the terrain.

Assuming the commutators to rotate in the direction of the arrows the commutator 62 will next close the circuit between brushes 11 and 19 which will apply the audio frequency to the vertical deflecting plates 6. At the same instant the commutator 64 will close the circuit between the brushes 8 and 27 thus connecting the direction indicator to the horizontal deflecting plates 5. That will produce a short vertical line such as 36 of Fig. 2 representing the deviation, if any, of the craft from a fixed radio beam or like fixed directive guide.

As the commutators continue to rotate, the distance indicating voltage will be applied through brushes 8 and 29 to the horizontal deflecting plates 5 simultaneous with the application of the audio frequency through brushes 11 and 23 of commutator 62 to the vertical deflecting plates. That will produce a vertical line such as 34 of Fig. 2, the horizontal position of which will indicate the distance of the craft from the fixed reference station.

It is to be noted that the electron stream of the oscilloscope that produces those traces upon the target 20 is permitted to strike the target only during the period in which the brush 15 of the commutator 60 is conductively connected to the other brush 42 of that commutator and, as has been previously pointed out, the duration of contact of the brush 15 with its coacting brush is shorter than the duration of contact of corresponding brushes upon the commutators 62 and 64.

The potentiometer $P_6$ and the battery $B_4$ permit the centering of the zero line of the direction indication as described above.

The output of the field localizer beacon receiver is a voltage whose polarity depends on the direction of departure from the true course, and the magnitude depends upon the amount of such departure. The application of this voltage through the commutator causes a deflection to the right or left of the index line 38 shown in Fig. 2 unless the craft is on course. In order to prevent the line 38 extending from the top to the bottom of the target, the audio frequency voltage applied to the vertical plants 6 is reduced by the drop in potential through the resistance $R_5$ and the center of the mark is shifted upwards by the adjustment of the potentiometer $P_5$. In that way confusion that may otherwise result with a vertical line representing distance, such as line 34, is thereby avoided.

Fig. 4 shows schematically a form of the invention employing amplifiers by means of which relatively lower voltages from the distance, direction and altitude measuring apparatus may be employed. The arrangement employs six amplifiers designated $A_1$ to $A_6$, inclusive. Those amplifiers are in turn arranged in groups of three, each of which groups has its plates connected in parallel and $A_1$ to $A_3$ are directly connected to one of the horizontal deflecting plates 5 of the cathode tube. The plates of the other group of tubes, namely, $A_4$ to $A_6$, inclusive, are connected to one of the vertical deflecting plates 6 of the said tube. The battery $B_6$, shown to the right of the tube $A_1$, furnishes the plate voltage to the tubes $A_1$ to $A_3$, inclusive, through the resistance $R_{10}$. Resistances $R_{11}$, $R_{12}$ and $R_{13}$ are connected in series with the battery $B_6$, and the voltage drop through resistances $R_{11}$ and $R_{12}$, when applied to the grid of that tube, is sufficient to cut off the plate current of the tube. Now it will be seen that the junction between resistances $R_{11}$ and $R_{12}$ is connected by conductor 50 to the brush 51 of the commutator 64 of the group of commutators that provides the switching arrangement for this form of the invention. Since the brush 52 of the commutator 64 is grounded, the resistance $R_{11}$ will be short-circuited whenever the circuit is closed through the brushes 51 and 52 which occurs approximately one-third of the operating time. During the period in which resistance $R_{11}$ is short-circuited, space current will flow through the tube $A_1$ and the drop in potential across the resistance $R_{10}$ will cause a deflection of the beam of the cathode ray oscilloscope.

The amplifiers $A_1$, $A_3$ and $A_5$ are connected by the switches $S_1$, $S_2$ and $S_3$, respectively, to the distance indicating device 10, the direction indicating device 14, and the altimeter 12, respectively. That apparatus which is the same or similar to the apparatus described in connection with Fig. 1 is adapted to apply a direct current voltage to the grids of the respective amplifier tubes. The amplifiers $A_2$, $A_4$ and $A_6$ are connected to a source of audio frequency 21, and the output of all amplifying tubes is adapted to be applied by means of the commutators to the deflecting plates of the cathode ray oscilloscope.

As in the case of the apparatus shown in Fig. 3, adjustment must be made for zero altitude, distance and deviation. To adjust for zero distance the switch $S_1$ is opened, and with the commutators rotating, the trace of light produced by the oscilloscope beam is positioned at the point 28 of the target shown on Fig. 2. This is accomplished by adjustment of resistance $R_{13}$. Then, with the switch $S_2$ open, the trace of light produced by the beam is positioned centrally in the upper segment of the target by adjusting resistance $R_{23}$. Deviation from the true course will be indicated by departure of the trace of light from that initial position. With the switch $S_3$ open, the trace of light is then positioned for zero altitude by the adjustment of the resistance $R_{33}$.

Thereupon the switches are closed and the direct current voltages from the several pieces of indicating apparatus will be applied to the oscilloscope, that is to say, the voltage from each indicating device will be applied to one set of deflecting plates simultaneous with the application of the audio frequency to the other set of plates. Specifically, the voltage from the distance indicator 10 will be applied to the horizontal plates 5 simultaneously with the application of the audio frequency through the amplifier $A_4$ to the vertical plates 6. This is obviously effected by the joint action of the several commutators 60, 62 and 64. As shown in Fig. 4, the brushes 51, 52 of the commutator 64 are conductively connected and the resistance $R_{11}$ is thereby shunted which permits the flow of current through the amplifier $A_1$; and at the same time the conductive connection of the brushes 17 and 11 of the commutator 62 shunts the resistance $R_{21}$ thus permitting the flow of plate current through the amplifier $A_4$. Furthermore, the brushes 42 and 15 of the commutator 60 are then also upon conductive segments which reduces the negative charge upon the control grid of the oscilloscope and permits the beam of electrons to strike the target 20.

As the commutators continue to rotate, in the direction of the arrows, the voltage from the direction indicator 14 will be applied through the amplifier $A_3$ to the horizontal plates 5 and, simultaneously therewith, the audio frequency from oscillator 21 will be applied through the amplifier $A_6$ to the vertical plates 6 thus producing a vertical trace on the target at a position to right or left of the "on course" line of the plane unless, of course, the craft heading is on the beam when the trace will fall on the index mark. Further rotation of the commutators will apply the voltage from the altimeter to the vertical plates and, simultaneously, the audio frequency to the horizontal plates to produce a trace indicative of the altitude of the plane above the zero line previously established. In this connection it should be noted that the audio frequency applied to $A_6$ is reduced by the setting of potentiometer $P_{10}$ in order to limit the length of the line traced in the upper part of the target.

It should be pointed out that in order to offset the direct current voltages on the deflecting plates, two potentiometers $P_3'$ and $P_4'$ and the battery $B_2'$ have been provided which function in the same way as similar apparatus described in connection with Fig. 3. Focusing of the beam of the tube is controlled by the voltage on the grid 4 and the brightness of the beam by the voltage on the grid 3. The dimensions of the segments of the commutator 60 of Fig. 4 are similar to the corresponding segments of the commutator 60 of Fig. 3 so that contact of the brushes with those segments begins later and ends earlier than the contact of the brushes upon the corresponding segments of the other commutators upon the same shaft.

The arrangement shown in Fig. 5 represents a form of embodiment of the invention which is free from a mechanically operated commutating device such as that which characterized the arrangements of Figs. 3 and 4. This is accomplished by the use of a plurality of square-topped waves which are applied in such phase relation to the amplifiers as to produce the same effect in the oscilloscope as that produced by the commutators of the preceding figures.

In Fig. 5 an oscillator or an alternating current generator 100 is connected to a plurality of shaping amplifiers $A_{10}$, $A_{11}$, $A_{12}$ and $A_{13}$.

The connection to $A_{11}$ includes a phase shifter 101 and that to $A_{12}$ a phase shifter 102.

The connection to the amplifier $A_{13}$ includes a tripling device 103 by means of which the frequency of the oscillator 100 is tripled before being applied through the phase shifter 104 to the amplifier $A_{13}$.

By methods well known in the television art it is possible in an amplifier by controlling the amount of overloading, to generate square-topped or rectangular waves, and by controlling the input amplitude to control the duration of the positive and negative portions of such a wave. For the purpose of the present invention it is desired that the wave generated by such an amplifier shall have a positive duration not less than two-thirds of the cycle of the wave.

This is represented by the graphs 105, 106 and 107 which represent the output of the amplifiers $A_{10}$, $A_{11}$ and $A_{12}$. It will be seen that the positive portion of each of those waves is in length equal to 240 degrees or more, and the negative portion 120 degrees or less. It will further be seen that the phase difference between waves 106 and 105 is equal to one-half of the length of the positive portion of 105; and, in like manner, wave 107 is phased to lag behind 106 by an amount equal to one-half of the length of the positive portion of 106.

The output of amplifier $A_{13}$ is represented by the wave 108 which in frequency is three times that of waves 105, 106 and 107. The negative portion of this wave should have not more than one-half of a cycle in duration. The phase of this wave should be adjusted so that the centers of the negative portions of each cycle coincide with the centers of the negative portions of waves 105 to 107, inclusive. Thus, it will be seen that the center line $x$ of the first negative portion of wave 108 corresponds in time with the center of the negative portion of wave 106; in like manner, the center $y$ of the next negative portion of 108 corresponds with the center $y$ of wave 107, and the center $z$ of wave 108 corresponds to the center $z$ of wave 105, the purpose of all of which will be clearly understood from later description of the invention.

The tubes of the amplifiers $A_{10}$ to $A_{13}$ are connected to the amplifiers shown at the right-hand side of the figure. Thus, the output of $A_{10}$ is connected to the amplifiers $A_{20}$ and $A_{23}$; the output of amplifier $A_{11}$ to amplifiers $A_{21}$ and $A_{24}$, and the output of amplifier $A_{12}$ to amplifiers $A_{22}$ and $A_{25}$. The output of amplifier $A_{13}$ is connected to amplifier $A_{32}$.

During the application of the positive voltage to the grids of tubes $A_{20}$ and $A_{23}$ for a period representing 240 degrees or more of wave 105, the said amplifiers become conductive and plate current will flow through those tubes from the battery $B_{10}$. During the negative portion of the cycle of wave 105 the plate current through the tubes $A_{20}$ and $A_{23}$ will be cut off. Tubes $A_{21}$ and $A_{24}$ and tubes $A_{22}$ and $A_{25}$ operate in similar fashion. The result of this is that the pairs of tubes mentioned hereinabove, namely, $A_{20}$ and $A_{23}$, $A_{21}$ and $A_{24}$, and $A_{22}$ and $A_{25}$, are each cut off during one-third of the time in rotation.

When the postive portion of wave 105 is applied to the grid of amplifier $A_{20}$ the space current of that tube flows to ground through resistance $R_{26}$, and the negative potential thereby created is applied to the grid of tube $A_{26}$ and is sufficient to block the plate current of that tube. Simultaneously, a similar effect takes place in tubes $A_{23}$ and $A_{29}$. The net result of all of which is that during the positive portion of the wave 105, no voltage will be applied to the oscilloscope by the distance indicator 10 and its associated oscillator 21.

However, during the negative portion of the wave 105, the space current of tubes $A_{20}$ and $A_{23}$ is blocked and the negative bias on the grids of tubes $A_{26}$ and $A_{29}$ is so reduced as to permit the flow of plate current therethrough. Thus the voltages of the distance indicator 10 and oscillator 21, suitably amplified, are applied to the plates of the oscilloscope.

The electron beam of the oscilloscope is established and disestablished in the following manner: The wave 108 when applied to the amplfier $A_{32}$ causes it to alternately draw high and low, or cut off values of the plate current. During the positive portion of the cycle of the voltage applied to the tube $A_{32}$ the cathode ray beam is cut off. During the negative part of the cycle of wave 108, when applied to tube $A_{32}$, the beam of the oscilloscope is established; and since the center of each negative part of wave 108 corresponds with a negative part of waves 105, 106 and 107, it will be seen that the beam of the oscilloscope is "on" and persists during the period during which the voltages of the several indicating devices and their associated oscillators are being applied to the plates of the oscilloscope.

With the switches $S_1$, $S_2$ and $S_3$ open, the variable resistors $R_{26}$, $R_{27}$, etc., in the circuits of the tubes $A_{26}$, $A_{27}$, etc., and the potentiometers connected to two of the deflecting plates of the cathode ray tube are adjusted to cause the line of zero altitude, the zero distance point and the "on course" direction to be traced. When this adjustment has been completed the switches are then thrown to connect the distance, direction and altitude indicating devices to the tubes $A_{26}$, $A_{28}$ and $A_{30}$, respectively. Thereafter those distances, directions and altitudes are shown upon the screen of the oscilloscope.

The operation of the circuits described hereinbefore, depends upon the ability of the distance, direction and altitude indicating apparatus to produce direct currents for application to certain of the deflecting plates of the oscilloscope as above described.

In the event that the output of such apparatus is an alternating current, it is necessary for the carrying out of this invention to translate that current into the form of a direct current voltage.

An apparatus peculiarly well adapted for effecting such translation is shown in Fig. 6. The basic principle of operation of the circuit of Fig. 6 is that of adding substantially equal increments of charge to the charge on a condenser for each of the positive half cycles of the alternating current which occur during a particular predetermined interval which is long with respect to the duration of one cycle of the lowest alternating current to be translated, and then determining the voltage which has been established on the condenser during the particular predetermined long interval. As applied to modify the system of Patent 2,206,896, above mentioned, it substitutes the apparatus to the right of vacuum tube $V_1$ (72') in Fig. 6 for the apparatus to the right of vacuum tube 72 of Fig. 5 of the patent. In the arrangement of Fig. 6, which is, viewed in one aspect, an improved type of frequency meter, the voltage to be rectified, designated $e_1$, is applied to the tube $V_1$, this tube having negligible resistance at low plate voltages when its control grid is at zero potential.

Connected to the plate of the tube $V_1$ is a source of potential, battery $B_{12}$ having a voltage $E_{12}$, the connection including the resistance R.

Connected between the plate and the grounded side of the tube $V_1$ are the condensers $C_1$ and $C_2$, the latter being shunted by the diode vacuum tube $V_3$ as shown. Diode $V_3$ has substantially infinite impedance when its anode is negative and substantially zero impedance when its anode is positive. The voltages across $C_1$ and $C_2$ are represented by $E_1$ and $E_2$, respectively.

Connected across the condenser $C_2$ also is the input of the tube $V_4$ which in turn feeds into the rectifier 72 through amplifier 70 as shown.

Connected to the junction between condensers $C_1$ and $C_2$ is the plate of the tube $V_2$ to the input of which is connected a circuit containing an oscillator 74, a phase shifter 76 and a shaping amplifier and doubler 78. The shape of the wave produced by the doubler 78 is shown by the graph associated therewith and designated $e_2$. The frequency of $e_2$ is never greater than the minimum value of $f$ which represents the variable frequency of the voltage $e_1$ shown in graph F. The function of the circuit just described, including oscillator 74, phase shifter 76, doubler 78, and vacuum tube $V_2$ is to periodically discharge condenser $C_2$ through the plate circuit of tube $V_2$ when voltage $e_2$ causes the control grid of $V_2$ to become positive. If the input wave F is of the type indicated by curve 33 of Fig. 2 of the above-mentioned patent to Higgins et al., $e_2$ should be adjusted to occur at the cross-over or zero frequency points and the voltage accumulated on $C_2$ will then represent directly the number of cycles (or frequency) of the wave 33 above mentioned between zero points which is, of course, a measure of the altitude.

During the charging interval for the condenser $C_1$, the same total current flows through both condenser $C_1$ and condenser $C_2$. When both condensers start with zero charge and are allowed to charge for an infinite time, or a time large compared to the time constant $RC_1$, the charges of both condensers are equal and a steady-state value is reached represented by the equation $$E_2 = \frac{E_{12}}{K+1} \qquad (1)$$

In Equation 1 the factor K is the quotient of $C_2$ divided by $C_1$. This value is represented by the graph shown in Fig. 6a, by the first step, $e_{2(1)}$, on the stair-shaped wave form $e_3$.

When this steady-state value of $E_2$ has been reached, the plate circuit of $V_1$, which has been blocked so far, is made conductive by the arrival of a positive one-half of a cycle of the input frequency $f$ and the condenser $C_1$ is completely discharged through the plate circuit of the tube $V_1$ and the diode $V_3$, leaving the voltage of condenser $C_2$ unchanged.

When the negative swing of the grid of the tube $V_1$ occurs, the plate of $V_1$ is again blocked and condenser $C_1$ recharges through resistance R and the condenser $C_2$. The charges gained by both $C_1$ and $C_2$ are equal but the total voltage available for charging is reduced by the step $E_{2(1)}$ and is represented by $E_{12}-E_{2(1)}$.

By continuing for the time interval represented by the distance between two adjacent pulses of voltage $e_2$ that process, the stair-shaped wave $e_3$ is built up. Each step is a little smaller than the previous one so it is evident that a strictly linear relationship cannot be obtained between the peak value represented by $E_{2(n)}$ and the frequency $f$ unless K is infinite. If, however, K is very much larger than 1, a relationship approaching substantial linearity can be obtained.

By using negative feedback in the amplifiers, including the tube $V_4$ and the later tubes, substantial constancy and linearity can be obtained.

Either polarity of direct current can of course be obtained from the final rectifier 72.

In using the apparatus just described with an oscillator, as shown in the previous figures, either the direct current from the rectifier can be used or the stair-step alternating current can be applied directly to the oscilloscope, and all steps, except the highest, can be blanked out if desired.

In an altimeter of the type described in the above-mentioned Patent 2,206,896 to Higgins et al., the oscillator shown should be that which drives the motor to produce the frequency modulation.

The phase shifter should be adjusted as stated above so that the positive portion of the rectangular wave produced by the doubler and the shaping amplifier occurs at the same point as the cross-over points, or the zero frequency points, in the signal supplied to the tube $V_1$, where that signal is of the type shown in Fig. 2 of the patent to Higgins et al. and designated 33.

Fig. 7 shows the details of arrangements for operating alarms when the altitude indicated by the altimeter reaches particular low values, such, for example, as 500 feet or 1000 feet, respectively, and also for giving an alarm when the signal strength falls to a predetermined low value to serve as a warning that the altitude indications may not be dependable. The arrangement shown in Fig. 7 is an improvement upon that shown in the above-mentioned patent to Higgins and Newhouse, No. 2,206,896, specifically in Fig. 5 of that patent, which discloses an altimeter circuit, and the same reference numerals with prime marks for corresponding pieces of apparatus have been used in Fig. 7 as are shown in the figure of the patent. As explained above, for use in systems of the present invention, the apparatus in the anode circuit of vacuum tube 72 of Fig. 5 of the patent should be replaced by the arrangement of Fig. 6 of this application, described in detail above. However, as this feature does not affect the alarm circuits now to be described Fig. 7 has not been so modified. The general structure of the circuit of Fig. 7 and its mode of operation, except for the alarm circuits now added, are the same as that of the patent. The exceptions are hereinafter noted and described in detail.

In the lead extending from the source of plate voltage to the plate of the tube 85' there has been inserted the relays 120 and 130 in series which operate upon particular current values being reached corresponding to altitudes of 1000 and 500 feet, respectively, for example. As explained in the above patent, an increase of the plate current occurs at low altitudes. The parameters of the feedback circuits and its associated control circuits must of course be adjusted so that the current in the circuit including relays 120 and 130 changes over at least the range within which alarms are to be actuated, in this instance up to 1000 feet. Across the armature and contact of relay 120 is connected a low altitude alarm 126 and a source of voltage 124. The altitude alarm 132 is similarly associated with relay 130.

Another relay, designated 122, is connected to conductor 104' that extends from the plate of tube 103' to the screen grid of the tube 85', to which conductor a source of plate voltage is also connected. Across the armature and contact of relay 122 is connected a circuit that includes the source of voltage 124 and an alarm, that indicates the absence of input signal to the altimeter receiver or its falling to a very low value.

Reference may be had to the patent to Higgins and Newhouse, mentioned above, for a detailed description of the mode of operation of the circuit of Fig. 7 of the drawings accompanying this specification, which, except for the alarm circuits and the adjustment of the feedback circuit as just described is, as above stated, identical with the circuit of Fig. 5 of the patent. For an understanding of the particular improvement being now described, viz. the addition of alarm devices, it is felt that the more general description given below will suffice.

The voltage representing the output of the detector of the altimeter is applied to the circuit of Fig. 7 between contact 59' and ground and upon amplification by the multistage amplifier, comprising stages 61', 24' and 62', is impressed upon the frequency measuring circuit 25'. The said amplifier is given a frequency-gain characteristic that rises with frequency but in order to avoid distortion in the low frequency range an automatically controlled feedback circuit 26' is provided. This cooperates with the network 21' so as to give the amplifier system a characteristic that at frequencies above the range of immediate interest is constant with frequency. In order to do this, the feedback amplifier 26' must be controlled according to frequency, and this is accomplished by the auxiliary frequency measuring circuit 27', in which the voltage across the resistor 99' is negative with respect to ground, and also is proportional to frequency. That voltage is applied to the control grid of the tube 85' of the feedback amplifier and varies directly the plate current of that tube. Accordingly, the plate current will increase at low altitudes, and the relays 120 and 130 may be set to operate their respective alarms 126 and 132 at any desired altitudes within the range in which the current increase occurs. Alarms 126 and 132 may be signal lamps or bells or the like.

To indicate the absence of signal voltage from the altimeter receiver, or its fall to an undesired minimum, the alarm 128 has been provided which depends upon the operation of the "lock-out" circuit 28'. When the voltage applied to the control grid of tube 103' is normal, it blocks the plate current of that tube and no current flows in conductor 104' in which relay 122, controlling alarm 128, is connected. When the received signal falls to a predetermined value the strength of the plate current flowing through conductor 104' will be sufficient to operate relay 122 and actuate the alarm 128. With the rise of signal strength to normal, relay 122 will be released and the alarm will cease. Alarm 128 can conveniently be a signal lamp or bell or like device.

While this invention has been disclosed as embodied in certain forms, it is obviously capable of embodiment in numerous other and different forms without departing from the spirit and scope of the appended claims.

What is claimed is:

1. A radio navigational system to facilitate the blind landing of aircraft which comprises, means for obtaining a first signal voltage which varies directly with the clearance or altitude of the craft above the surface of the earth beneath it, means for obtaining a second signal voltage which varies directly with the distance of the craft from a fixed point on the earth, means for obtaining a third signal voltage which varies directly with deviation from a known fixed course, a cathode ray indicator including horizontal and vertical deflecting plates, a control anode and a retentive luminescent target or screen, first, second and third ray positioning adjustable potential sources, an anode control potential source, a source of sweep circuit voltage, and circuit and commutating means for successively presenting to the cathode ray indicator three different combinations of a signal voltage, a ray positioning voltage, a sweep voltage and an anode control voltage, one said voltage combination comprising the presentation to the deflecting plates of positioning voltages to position the ray at a point on the target representing zero distance and zero clearance or altitude on the target of the tube, the presentation to the horizontal deflecting plates of a sweep voltage to sweep the ray horizontally across the target, the presentation to the vertical deflecting plates of the first said signal voltage and the presentation to the control anode of a voltage permitting the ray to reach the target whereby a horizontal line is traced on the target of said cathode ray indicator at a vertical distance above the point or line of zero altitude which is determined by the altitude of the craft, a second said voltage combination comprising the presentation to the deflecting plates of positioning voltages to position the ray at a point on the target representing zero distance and zero clearance or altitude, the presentation to the vertical deflecting plates of a sweep voltage to sweep the ray vertically across the target, the presentation to the horizontal deflecting plates of the second said signal voltage and the presentation to the control anode of a voltage permitting the ray to reach the target whereby a vertical line is traced on the target of said cathode ray indicator at a horizontal distance from the point of zero distance which is determined by the distance of the craft from the said fixed point on the earth and a third said voltage combination comprising the presentation to the deflecting plates of positioning voltages to position the ray at an index mark representing the on course heading of the craft, the presentation to the vertical deflecting plates of a sweep voltage to sweep the ray vertically across a portion of the target determined by the aforesaid just-mentioned positioning voltages, the presentation to the horizontal deflecting plates of the third said signal voltage and the presentation to the control anode of a voltage permitting the ray to reach the target whereby a vertical line is traced on the target of said cathode ray indicator at a horizontal distance from the index mark which is determined by the heading of the craft with respect to the on course heading, said commutating means effecting the said successive presentations of the said three described voltage combinations with sufficient rapidity to establish on the target of the cathode ray indicator simultaneously the indications as described of clearance or altitude, distance and course heading whereby the aircraft navigator may determine at a glance the clearance or altitude, the distance and the course heading of the craft.

2. The system of claim 1 the target of said cathode ray tube being inscribed with an inclined line the lower end of said line resting on the point of said target selected to represent zero clearance or altitude and zero distance, the line forming an angle with the lateral horizontal axis of said target which corresponds to an appropriate landing path angle for said craft whereby the navigator of the craft can follow the said appropriate landing path by maneuvering the craft so that the intersection of the horizontal clearance indicating line and the vertical distance indicating line, described in claim 1, coincides with the said inclined line at all times during the landing operation.

3. The system of claim 1 the target of said cathode ray tube being inscribed with a plurality of inclined lines representing a plurality of landing paths whereby the navigator of said craft may follow any of the said paths in bringing the craft to a landing, his selection being made in view of the prevailing conditions at the time of landing.

4. In a blind landing system for aircraft, a cathode ray indicator including a luminescent target thereon, said target having inscribed on it a plurality of lines including a horizontal scale calibrated in terms of distance, a vertical scale calibrated in terms of altitude, and a plurality of lines all terminating at the zero end of the aforementioned horizontal scale but inclined with respect thereto at different angles appropriate for landing aircraft under a like plurality of particular predetermined landing conditions, respectively, and means for successively deflecting the ray of said indicator to trace on said target a vertical line the lateral position of which indicates distance from a particular beacon station and a horizontal line the vertical position of which indicates the altitude the the craft, said traces recurring at sufficiently frequent intervals to appear continuous whereby a glide angle corresponding to any one of the said inclined lines may readily be maintained by maneuvering to keep the intersection of said altitude and said distance indicating lines on the selected inclined line.

5. In a blind landing system for aircraft, the combination of means for providing on said craft two voltages the magnitudes of which represent, respectively, the distance of said craft from a reference point and the altitude of said craft above the earth's surface, a cathode ray indicator including a target therefor, a horizontal scale associated with said target representing distance from said predetermined point, and a vertical scale associated with said target representing altitude above the earth, and switching means for successively and repeatedly connecting the said two voltages in conjunction with appropriate sweep circuit voltages and bias voltages to the deflecting plates of said indicator to provide intersecting traces on said target whereby a point of intersection is obtained the position of which indicates both the distance from a reference point and the altitude of said craft.

6. In a navigating system for aircraft, an altimeter system including a signal amplifier and a feedback circuit operatively coupled with said amplifier to produce distinctive modifications in the response of said amplifier for a plurality of particular predetermined ranges of altitudes respectively and a like plurality of alarm circuits, operatively coupled with said feedback circuit to operate a particular distinctive alarm signal for each of the said respective operative conditions of said feedback circuit whereby the attention of the navigator of the aircraft is directed to significant changes in the altitude of the craft.

7. In a navigating system for aircraft, an altimeter system including a signal amplifier, feedback means operatively coupled with said amplifier to modify the response of said amplifier over particular ranges of altitude, a second means operatively coupled with said amplifier to render said feedback means inoperative for currents below a predetermined amplitude, and an alarm circuit operatively coupled with said second means to operate an alarm signal when said second means disables said feedback means whereby the attention of the navigator of the aircraft is directed to the fact that the altimeter system is not receiving sufficient signal to provide reliable altitude indications.

8. The system of claim 1, the first-stated means thereof comprising an altimeter system which includes a signal amplifier and a feedback circuit operatively coupled with said amplifier to produce distinctive modifications in the response of said amplifier for a particular predetermined range of altitudes, and an alarm circuit operatively coupled with said feedback circuit to operate an alarm signal when said feedback circuit operates to produce a particular modification in the response of the amplifier whereby the aircraft navigator is apprised of the fact that the craft has approached within a particular distance of the earth's surface.

9. The system of claim 1, the first-stated means thereof comprising an altimeter system which includes means for modifying the response of the altimeter system for currents below a predetermined amplitude and an alarm circuit operatively connected with the last-stated means to operate an alarm signal when the last-stated means modifies the response of the altimeter system whereby the navigator of the aircraft is apprised of the fact that insufficient signal is being received by the altimeter system to provide reliable altitude indications.

10. In a navigational system the combination of a distance measuring system providing an alternating current the frequency of which is an index of distance and means for converting the said alternating current into a direct current voltage the magnitude of which is an index of distance said voltage varying in a substantially linear manner with distance, said means comprising a first vacuum tube having negligible resistance at low plate voltages when its control grid is at zero potential, a source of potential, a resistance, and two capacities $C_1$ and $C_2$, the negative terminal of said potential source being grounded, the positive terminal being connected to one terminal of said resistance, the other terminal of the resistance connecting to one terminal of capacity $C_1$, and to the anode of said first vacuum tube, the other terminal of $C_1$ connecting to a terminal of capacity $C_2$, the other terminal of capacity $C_2$ connecting to the cathode of said first tube and to ground, a unidirectional conducting device electrically shunted across capacity $C_2$ said device being poled to prevent the discharge of capacity $C_2$ therethrough, a second unidirectional periodically conducting device electrically shunted across capacity $C_2$, means for controlling the periods of conductivity of said last-stated device to discharge capacity $C_2$ at intervals relatively long with respect to the lowest periodicity of the said alternating current the frequency of which is an index of distance, and means for indicating the voltage which is established across capacity $C_2$ during the charging intervals thereof.

11. In a navigational system the combination of a distance measuring system providing an alternating current the frequency of which is an index of distance, means for deriving from said alternating current a direct current voltage proportional to the frequency of said alternating current which comprises a capacity, means for adding an increment of charge to the charge in said capacity for each positive half cycle of said alternating current occurring during a definite predetermined time interval, and means for measuring the voltage established across said capacity at the end of said predetermined time interval whereby a direct current voltage the magnitude of which is a measure of the distance indicated by said distance measuring circuit current is obtained.

12. In a navigational system the combination of a distance measuring system providing an alternating current, the average frequency of which is an index of distance, the frequency of said current passing through zero at regular periodically recurring intervals which are long with respect to the duration of a cycle of said alternating current, means for deriving from said alternating current a direct current voltage proportional to the frequency of said alternating current which comprises a capacity, means for adding substantially equal increments to the charge in said capacity for each positive half cycle of said alternating current occurring during a definite predetermined time interval, means for adjusting this predetermined time interval to coincide with the above-mentioned interval between the zero points of the said alternating current, and means for measuring the voltage established across the said capacity at the end of said predetermined time intervals, whereby a direct current voltage the magnitude of which is a measure of the distance indicated by said distance measuring circuit is obtained and an indication of distance conveniently adaptable for use in said navigational system can readily be provided.

RUSSELL C. NEWHOUSE.